June 19, 1962 P. SCHREIBER ET AL 3,039,481
MAGNETIC CONTROL FOR RESPIRATOR VALVE
Filed Jan. 20, 1959

INVENTORS
Peter Schreiber
Herbert Claudius

BY Bailey, Stephens & Huettig
ATTORNEYS

3,039,481
MAGNETIC CONTROL FOR RESPIRATOR VALVE
Peter Schreiber and Herbert Claudius, Lubeck, Germany, assignors to Otto Heinrich Drager, Lubeck, Germany
Filed Jan. 20, 1959, Ser. No. 787,875
Claims priority, application Germany Feb. 28, 1958
4 Claims. (Cl. 137—64)

This invention relates to respirators and in particular to the magnetic control of the operating valves for respirators.

Artificial respiration devices of various types are equipped with a control mechanism by means of which the valves in the air passages are opened and closed in dependence upon changes in pressure. Ordinarily, in these devices, a diaphragm is used to produce the control force, the diaphragm being mounted so that it moves in one direction under a high pressure and in the opposite direction under a low pressure. Other elements are also used to produce the control force instead of the diaphragm.

In order to fix the pressure at which a valve movement takes place, it is known to pre-load the control means with some suitable force in one or the other direction. Hence, the valve moving mechanism is set so that it shifts upon the occurrence of a pre-determined high or low pressure.

Either tension or compression springs have been used to control the pressure at which a diaphragm can be moved, these springs being adjustable. Such springs have the disadvantage in that the force needed to move the diaphragm changes as the tension in the springs changes, as the spring exerts a continuous force upon the diaphragm by being in contact therewith.

Also, magnets have been used for producing forces upon the diaphragm in the direction of either of its two terminal positions. Magnets adhering to the diaphragm have been used. The attracting force of the magnets determines the pressure or force needed to shift the diaphragm. For adjusting the shift pressure to a desired value, it is known to use adjustable springs in combination with the magnets. Furthermore, it is known to use magnets whose direction of magnitude can be turned between the north and south poles. When additional springs are used, the disadvantage of a changing spring pressure continues to exist. A difficulty also exists in that the force path characteristic of a spring depends upon its movement which, in turn, as in the construction mentioned, depends upon the displacement of the armature moving between the magnets. When only a small armature movement is possible, only a small regulating path for the additional spring is available. Armatures turnable between their north and south poles have the disadvantage in that the armature seeks to position itself so that it is placed opposite either the north or south pole. When only small shifting forces are necessary, large frictional forces occur which produce a unilateral flank load at the friction points for the armature. Another difficulty lies in that any adjustment must be performed on the parts which are connected directly with the diaphragm and become moved during the shifting of the diaphragm. Consequently, the whole operating mechanism is likely to be disturbed and to need re-adjustment.

The objects of this invention are to produce a valve control which is not subject to the disadvantages of the several known devices.

In general, the invention controls the valve shifting mechanism for artificial respirators by means of magnets. The force of these magnets is made variable. By adjusting the magnetic force, the forces acting upon the diaphragm are adjustable to any desired value. In this invention, the magnet can be used for each shifting position, and each magnet can be separately variable in force. Thus this has the advantage that the force upon the diaphragm in one direction can be altered dependent upon the force acting on the diaphragm in the other direction and can be adjusted to any desired value.

The magnets can be electromagnets so that the force of the magnets can be adjusted at will by varying the current intensity.

In another modification of the invention, one or more additional magnets may be movably positioned adjacent a stationary magnet. This is of especial advantage when permanent magnets are used for the stationary magnets. When the distance between the additional magnets and the permanent magnet is varied, the field of the stationary magnet changes. Furthermore, the attracting force of the stationary magnet can be attained in other ways, as, for example, by producing a more or less intensive magnetic short-circuit, ground field, or by an additional magnetic field which affects the stationary magnets.

In another form of the invention for producing the same effect, a magnetic permeable armature, preferably of soft iron, is used. Such soft iron armature is moved to or from the stationary magnet. As examples of varying the magnetic force of the control magnet, the force of the permanent or stationary magnet can be varied by bringing one or more adjustable armatures closer or further from its respective permanent magnet, thus changing the lines of magnetic force of the permanent magnet. A magnetic short-circuit or ground field or additional field can be produced in various ways, as, for example, by varying the distance of the soft iron armature from a permanent magnet. Another permanent magnet can also be moved to or from a stationary or permanent magnet in the same manner and again the direct electric current applied to the magnet may be varied, or the electromagnet moved relative to the stationary magnet.

It is expedient when using permanent magnets to magnetize them to the extent that the diaphragm or armature connected therewith is lifted or shifted from its terminal position only when the maximum desired high or low pressure is used to shift the diaphragm. In other words, the force of the permanent magnets is chosen so that because of the magnets the highest shifting pressure can be pre-set.

Again, the diaphragm can be provided with an armature of soft iron, nickel, or the like, fixed to the diaphragm. A non-rotatable armature considerably simplifies the apparatus. This armature, according to the position of the diaphragm, contacts another magnet.

This invention also has the advantage that adjustments of magnetically reciprocating parts of the shifting mechanism are eliminated. This, in turn, eliminates such obscure frictional forces which could influence the adjustment and whose value would change during adjustment. Another advantage is in that, when the adjusting force is varied in one direction, it does not require necessarily an adjustment of the force in the other moving direction. The adjustment forces in each direction can be varied independently of the other to any degree.

In other form of the invention, it is of advatnage to construct the permanent magnets as valve seats. The armature or armatures are shaped as valve heads. This further simplifies the apparatus.

The means by which the objects of the invention are obtained are described more fully with reference to the accompanying drawings, in which.

Figure 1A:
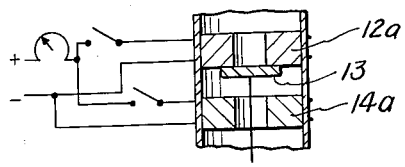
FIGURE 1a is a partial view similar to FIGURE 1 of a modified form.
Figure 1:
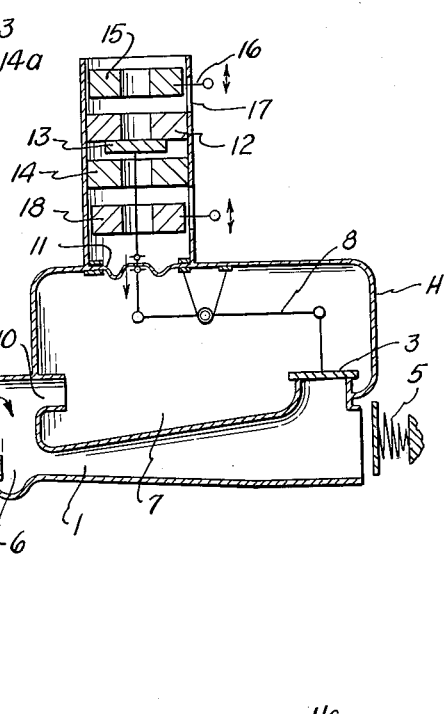
FIGURE 1 is a diagrammatic cross-sectional view of one form of the invention.

As shown in FIGURE 1, the respirator is composed of a container H having therein a Venturi-like aspirating tube 1 connected by a pipe 2 to a tank T of oxygen or compressed air. Air or oxygen from pipe 2 passes through the throat of tube 1. When air is exhaled from lungs 9, valve 3 is closed so that aspirating tube 1 sucks air from the lungs in the direction of arrow 9a and forces it out into the atmosphere through check valve 5. This causes a low pressure in lung 9 which also exists in passageway 6, and again in conduit 10 communicating with chamber 7 in which a control valve linkage 8 is mounted. As soon as lung 9 is emptied of air, the low pressure there and in chamber 7 is further reduced until diaphragm 11 is under such differential pressure as to move and separate armature 13 from the stationary permanent control magnet 12. Armature 13 comes to rest on stationary magnet 14. Linkage 8 thereupon opens valve 3.

Above magnet 12 is a movable soft iron armature 15 having a handle 16 protruding through a slot 17 in the housing. A scale is provided at the edges of the slot by means of which the distance armature 15 is moved from magnet 12 is accurately adjusted to any value. When armature 15 is moved close to magnet 12, the latter's magnetic force acting upon armature 13 decreases due to some of the lines of flux from magnet 12 being diverted to armature 15. This results in the movement of the diaphragm 11 occurring at a lower pressure since a smaller force from magnet 12 attracts armature 13. The starting pressure for the movement can be set for any desired value simply by moving armature 15.

When valve 3 opens, check valve 5 closes, and the air or gas from tank T flowing through aspirator tube 1 passes through open valve 3 into chamber 7 and from there to tube 10 into lung 9. The apparatus is then functioning for inhaling so that a pressure rise is produced in lung 9 and in chamber 7, which pressure acts on diaphragm 11.

When this inhaling pressure upon diaphragm 11 exceeds the attracting force on armature 13 from control magnet 14, the diaphragm lifts armature 13 off magnet 14, with the armature being again attracted by magnet 12 in the position shown in FIGURE 1. This, through linkage 8, closes valve 3. Inhaling is then finished, and exhaling is ready to begin.

As shown in FIGURE 1a, the force exerted upon armature 13 can be varied by the use of electromagnets 12a and 14a. The magnetic force of each of these magnets can be individually controlled by varying the intensity of the current supplied through a rheostat.

Figure 2:
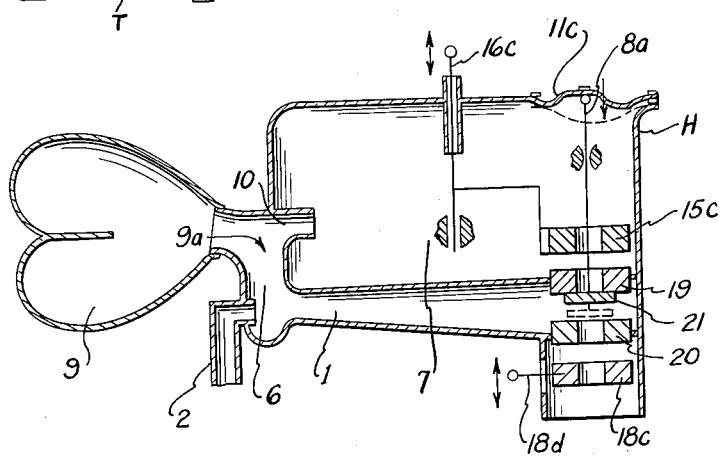
FIGURE 2 is a cross-sectional view of a further modified form.

In FIGURE 2, the stationary control magnets 19 and 20 have valve openings furnished with valve seats, and the armature 21 functions as a valve head closable upon the seats. In this form of the invention, the valve 3 and the check valve 5 of FIGURE 1 are eliminated. As before, the aspirating tube 1 receives air or oxygen from pipe 2. As shown, the armature 21 is resting against magnet 19 and the gas in tube 1 passes through the valve opening in permanent magnet 20 into the atmosphere. This produces a low pressure in passageway 6 so that the contents of lung 9 are drawn off in the direction of arrow 9a and pass through magnet 20 into the atmosphere. The pressure sensitive diaphragm 11c communicates with lung 9 through chamber 7 and tube 10. When lung 9 is emptied, the low pressure therein appears in chamber 7 and acts on diaphragm 11 to separate armature 21 from magnet 19 by means of rod 8a, and the armature comes in contact with magnet 20. The opening in magnet 20 is thus closed by the armature resting in the valve seat so that the opening in magnet 19 receives the gas from tube 1 with the gas passing into chamber 7. The gas then flows through tube 10 into lung 9 affording respiration.

When lung 9 is filled, it causes an excess pressure to build up in chamber 7, which pressure forces diaphragm 11a upwardly and lifts armature 21 from magnet 20 to rest against magnet 19. Respiration is then finished. The rod 8a and the diaphragm are then again in the position shown in FIGURE 2 ready for the lung to exhale.

As explained with respect to FIGURE 1, a magnetic short-circuit is obtained by adjusting the position of armatures 15c and 18c with respect to their positions relative to magnets 19 and 20 by means of levers 16c and 18d, respectively, so that the force produced by the pressure in chamber 7 must act upon diaphragm 11 until it lifts armature 21 from magnets 19 or 20, respectively.

Having now described the means by which the objects of the invention are obtained, we claim:

1. In combination with a respirator having a housing, valve actuating diaphragm means mounted in said housing and subject to opposing forces acting on opposite faces thereof, a magnet mounted on said housing and having a magnetic flux field, and armature means connected to said diaphragm means and movable in said magnetic flux field for changing the pressure required to actuate said diaphragm means, the improvement comprising a metal body means mounted for movement toward and away from and within the flux field of said magnet for varying the strength of said flux field and therewith the force required to actuate said diaphragm means.

2. In a respirator as in claim 1, said improvement further comprising lever means connected to said metal body means for adjusting the position of said metal body with respect to said magnet.

3. In a respirator as in claim 2, said magnet comprising a valve seat.

4. In a respirator as in claim 3, said armature means comprising a valve head seatable upon said valve seat.

References Cited in the file of this patent

UNITED STATES PATENTS

| 2,708,944 | Modine | May 24, 1955 |
| 2,736,331 | Seeler | Feb. 28, 1956 |
| 2,836,773 | Skrobisch | May 27, 1958 |
| 2,926,691 | Huff | Mar. 1, 1960 |
| 2,996,071 | Takaoka | Aug. 15, 1961 |